United States Patent [19]

Koshkin et al.

[11] 4,204,910

[45] May 27, 1980

[54] GRIPPING MEANS FOR REFUELLING A NUCLEAR REACTOR

[76] Inventors: Jury N. Koshkin, ulitsa Zvezdinka, 3, kv. 10; Georgy V. Ordynsky, ulitsa Strazh revoljutsii 9/6, kv. 9; Tsolak G. Shkhiyan, naberezhnaya imeni Zhdanova, 6, kv. 12; Alexandr F. Shapkin, ulitsa Zvezdinka, 3, kv. 64; Alexandr I. Fadeev, ulitsa Engelsa, 21, kv. 46; Fedor V. Laptev, prospekt Lenina, 57, kv. 31; Vladimir I. Batjukov, ulitsa Prygunova, 9, kv. 29; Konstantin I. Korolkov, ulitsa Shalyapina, 19, kv. 77; Ivan V. Borodin, ulitsa Shalyapina, 15, kv. 2, all of Gorky, U.S.S.R.

[21] Appl. No.: 827,331

[22] Filed: Aug. 24, 1977

[51] Int. Cl.² .............. G21C 19/20; B66C 17/08; B66C 1/10
[52] U.S. Cl. ................. 176/30; 294/86 A; 414/146
[58] Field of Search .............. 176/30; 214/18 N; 294/86 A

[56] References Cited

U.S. PATENT DOCUMENTS

| | | | |
|---|---|---|---|
| 3,295,883 | 1/1967 | Dupuy | 176/30 |
| 3,337,257 | 8/1967 | Brynsvold | 176/30 |
| 3,629,069 | 12/1971 | Wright | 176/30 |
| 3,795,420 | 3/1974 | Preston | 176/30 |

Primary Examiner—Charles T. Jordan
Assistant Examiner—Donald P. Walsh
Attorney, Agent, or Firm—Fleit & Jacobson

[57] ABSTRACT

The proposed gripping means of a refuelling machine for a nuclear reactor is arranged in a manipulator tube of the machine. Longitudinally extending grooves are provided on the internal surface of the manipulator tube. The gripping means comprises a housing which accommodates a slider with thrust pins which are in contact with the longitudinally extending grooves of the manipulator tube. A working member is secured at one end of the slider. At the opposite end of the slider there is provided a hole to receive a spherical lug provided on a rod. The latter is mounted on the housing of the gripping means and is driven by the machine's drive. The spherical lug of the rod is in contact with the surface of the slider, thus forming an articulated joint, whereby the slider is mechanically coupled to the rod.

4 Claims, 3 Drawing Figures

GRIPPING MEANS FOR REFUELLING A NUCLEAR REACTOR

The present invention relates to refuelling machines for nuclear reactors and, more particularly, to a gripping means of a refuelling machine for a nuclear reactor.

The invention can be used to advantage in fuel recharging equipment of nuclear reactors whose fuel assemblies have heads with an external projection or an internal slot to engage with the gripping means' working member.

There is known a gripping means of a refuelling machine for a nuclear reactor, arranged in a manipulator tube having longitudinally extending grooves on its internal surface, which gripping means comprises a housing accomodating a slider with a working member pivotably secured at one of its ends, whereas its opposite end is mechanically coupled to a rod mounted on the housing of the gripping means and driven by the refuelling machine's drive; provision is also made for thrust pins which are in contact with the longitudinal grooves of the manipulator tube.

In this gripping means, the slider is mechanically coupled to the rod by interposing an auxiliary pin between the slider and the rod. One end of said pin is pivotably mounted on the slider, while its opposite end is pivotably secured to the slider; the centers of the two articulated joints thus formed are spaced at a predetermined distance from each other.

The use of the auxiliary pin and two articulated joints to couple the slider to the rod accounts for free vibrations of the slider and the working member in both articulated joints as the refuelling machine is brought against the head of a fuel assembly, or as the gripping means moves inside the manipulator tube to insert the head into the working member. Due to such vibrations, the fuel assembly head may miss the working member and thus is not gripped; it may also bump into the gripping means and damage it.

As a fuel assembly is installed in the reactor core or in a socket of a container arranged outside the reactor, the drive of the refuelling machine must transmit a considerable force to the fuel assembly through the gripping means. The transmission of a downward force through the auxiliary pin and two articulated joints may lead to an uncontrolled turn of the slider in said articulated joints relative to the stationary rod and thus disable the working member.

It is an object of the present invention to improve the operational reliability of the gripping means of a refuelling machine as it is brought against a fuel assembly whose longitudinal axis is not matched with that of the gripping means.

It is another object of the invention to make it possible to transmit a downward force from the refuelling machine's drive to a fuel assembly through the gripping means without damaging said gripping means, as said gripping means is brought against said fuel assembly, or as said fuel assembly is installed in the reactor core or in a socket of a container arranged outside the reactor.

The objects of the present invention are attained by providing a gripping means of a refuelling machine for a nuclear reactor, arranged in a manipulator tube having longitudinally extending grooves on its internal surface, which gripping means comprises a housing accomodating a slider, at one of whose ends there is pivotably secured a working member, whereas the opposite end of the slider is mechanically coupled to a rod mounted on the housing of the gripping means and driven by the refuelling machine's drive, and thrust pins which are in contact with the longitudinal grooves of the manipulator tube, said gripping means being characterized, according to the invention, in that the rod is provided with a spherical lug, whereas the slider is provided with a hole to receive the spherical lug which is in contact with the slider's surface and thus forms a main articulated joint, whereby the slider is mechanically coupled to the rod.

It is expedient that the spherical lug of the rod should be so arranged in the hole of the slider that at a moment the working member grips the head of a fuel assembly, the center of the main articulated joint is on the longitudinal axis of the thrust pins mounted on the slider and contacting the end walls of the longitudinally extending grooves.

The housing of the gripping means may carry a support with a spherical lug; in such a case, the rod is provided with a thrust collar arranged at some distance from the spherical lug and having a spherical recess interacting with the spherical lug of the support, thus producing an additional articulated joint whose center is matched with that of the main articulated joint; the two articulated joints help to transmit the driving force from the refuelling machine's drive to a fuel assembly.

The proposed design of a gripping means of a nuclear reactor refuelling machine improves the alignment of the gripping means with a fuel assembly whose longitudinal axis is not matched with that of the gripping means and thus improves the operational reliability of the refuelling machine.

Other objects and advantages of the present invention will be more readily understood from the following detailed description of a preferred embodiment thereof to be read in conjunction with the accompanying drawings, wherein.

Figure 1:
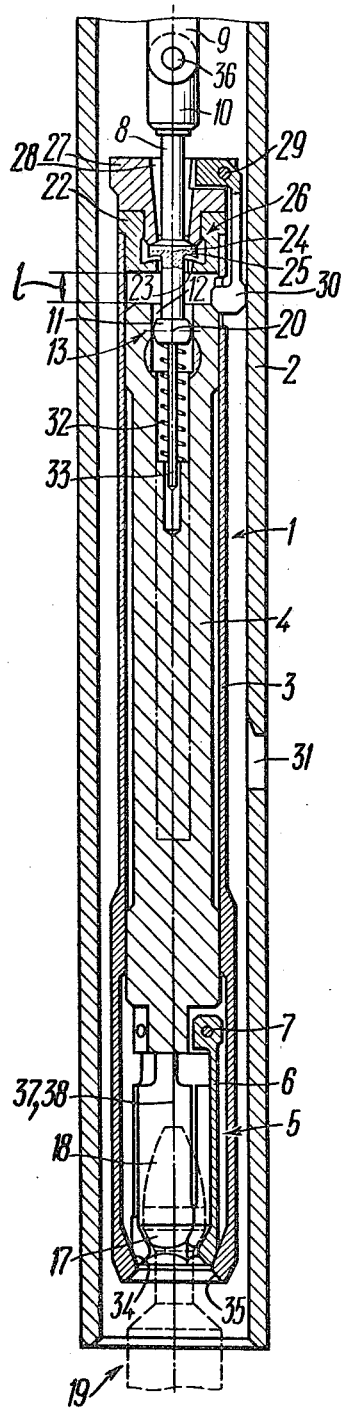
FIG. 1 is an elevation view of a gripping means of a refuelling machine for a nuclear reactor with the working member in its closed position, in accordance with the invention.

Referring to the attached drawings, the proposed gripping means 1 (FIG. 1) of the refuelling machine for a nuclear reaction is arranged, according to the invention, in a manipulator tube 2 of the refuelling machine (for greater clarity, the machine is not shown, nor dealt with in the text of the disclosure). The manipulator tube 2 is adapted for upward and downward motion. The gripping means 1 comprises a housing 3 which accomodates a slider 4. A working member 5 is secured at one end of the slider 4. The working member comprises three jaws 6 pivotably mounted on axles 7. There must be at least two such jaws.

The housing 3 also accomodates a rod 8 which is mechanically coupled to the slider 4. The machine's drive drives the rod 8 by means of a chain 9 with a shackle 10 (only a portion of one link of said chain 9 is shown).

The rod 8 is provided with a spherical lug 11. In the slider 4 there is provided a hole 12 to receive the spherical lug 11 which interacts with the surface of the slider 4 and thus forms a main articulated joint 13, whereby the slider 4 is mechanically coupled to the rod 8.

Figure 2:
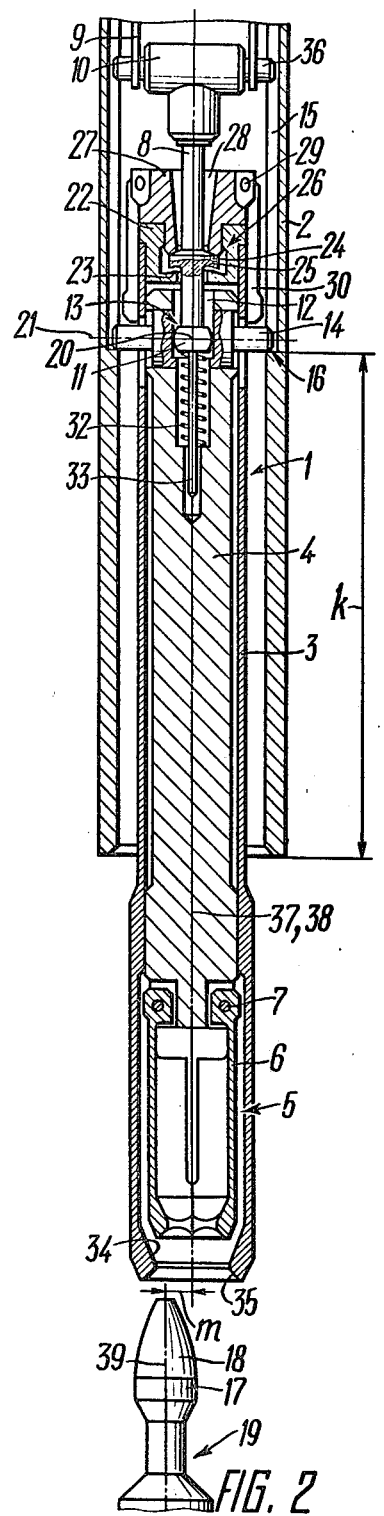
FIG. 2 is a general elevation view of the gripping means of FIG. 1, taken in the plane perpendicular to that of FIG. 1, with the working member in its open position and with the head of a fuel assembly whose axis is misaligned with respect to the longitudinal axis of the gripping means.

Thrust pins 14 are mounted on the slider 4 (FIG. 2) to interact with longitudinal grooves 15 provided on the internal surface of the manipulator tube 2. The grooves 15 are rectilinear and extend in parallel with the axis of the manipulator tube 2. The grooves 15 end at a distance k from the end face of the manipulator tube 2; the end walls of said grooves 15 serve as supporting surface 16.

The spherical lug 11 of the rod 8 is so arranged in the hole 12 of the slider 4 that at a moment the working member 5 grips an outer projection 17 of a head 18 of a fuel assembly 19, a center 20 of the main articulated joint 13 is found on a longitudinal axis 21 of the thrust pins 14 of the slider 4, which interact with the end walls (the supporting surfaces 16) of the longitudinally extending grooves 15.

Mounted on the housing 3 (FIG. 1) is a support 22 with a spherical lug 23. At some distance from the spherical lug 11, the rod 8 is provided with a thrust collar 24 having a spherical recess 25 interacting with the lug 23 and thus producing an additional articulated joint 26 whose center is matched with the center 20 of the main articulated joint 13. The articulated joints 13 and 26 serve to transmit the driving force from the refuelling machine's drive to a fuel assembly being handled.

Figure 3:
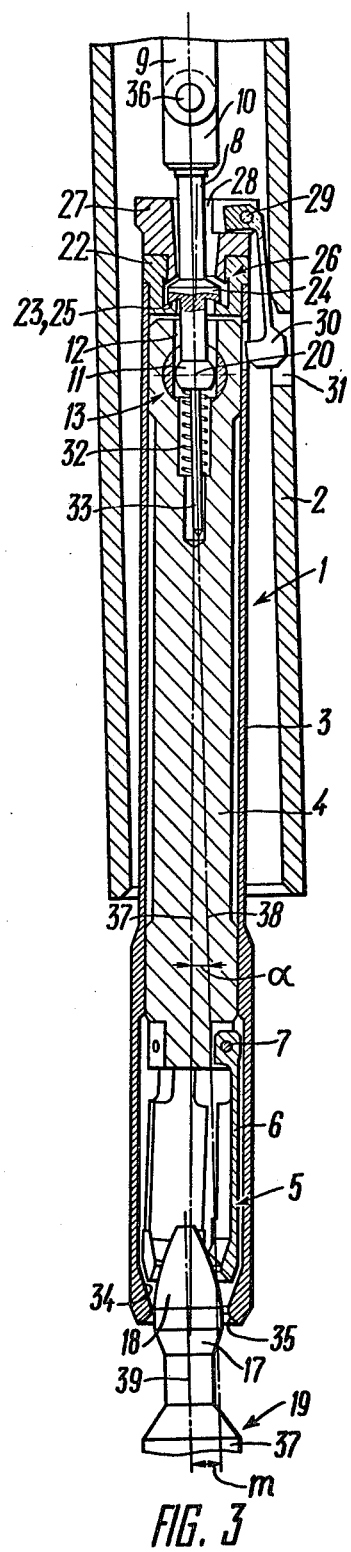
FIG. 3 is an elevation view of a gripping means in accordance with the invention, taken at the start of inserting the head of a fuel assembly, whose longitudinal axis is misaligned with respect to that of the gripping means, into the working member of the gripping means (a general view of the fuel assembly head is presented).

On the support 22 there is mounted a bushing 27 having a conical internal surface 28 through which the rod 8 extends. Pivotably mounted on axles 29 on the bushing 27 are locks 30 which interact with the slider 4 and are forced by the latter into apertures 31 (FIG. 3) provided in the manipulator tube 2, when the thrust pins 14 abut against the supporting surfaces 16.

The hole 12 (FIG. 1) of the slider 4 receives a spring 32. One end of the spring 32 abuts against the spherical lug 11, while its opposite end abuts against the slider 4.

At the end face of the rod 8, on the side of the spherical lug 11, there is secured an end of an elastic rod 33 whose opposite end interacts with the slider 4.

On the side of the jaws 6, the housing 3 of the gripping means 1 has a conical surface 34 to close the jaws 6 upon gripping the fuel assembly 19 (FIG. 2), and a conical surface 35 (FIG. 1) to orientate the gripping means 1 in relation to the head 18 (FIG. 2) of the fuel assembly 19.

Axles 36 of each link of the chain 9 are received in the lonitudinally extending grooves 15 of the manipulator tube 2.

The operating principle of the proposed gripping means of a nuclear reactor refuelling machine is as follows.

In the initial position, the gripping means 1 (FIG. 1), having a longitudinal axis 37, is fully inside the manipulator tube 2, having a longitudinal axis 38, and is suspended in said manipulator tube 2 on the chain 9. The axes 37 and 38 are in alignment. Under the action of the spring 32, which interacts with the slider 4, the jaws 6 of the working member 5 are pressed to the conical surface 34 of the housing 3 and closed. Between the slider 4 and the support 22 mounted on the housing 3 there is a gap L, wherein there is disposed the lock 30 which abuts against the slider 4 and prevents the latter's displacement with respect to the housing 3.

Under the action of the refuelling machine's drive, the chain 9 and the gripping means 1 are lowered inside the manipulator tube 2. As a result, the gripping means 1 (FIG. 2) partially protrudes from the manipulator tube 2. The thrust pins 14 of the slider 4 abut against the supporting surfaces 16 of the longitudinally extending grooves 15. The slider 4 stops, while the housing 3 with the support 22 and the rod 8 continue going down. The width of the gap L is reduced until the end face of the slider 4 comes into contact with the support 22 so that 1=0. As this takes place, the locks 30 (FIG. 3) are forced by the slider 4 from the gap 1 into the apertures 31 of the manipulator tube 31. The spherical lug 11 moves inside the hole 12, and the center 20 (FIG. 2) of the main articulated joint 13 is found on the longitudinal axis 21 of the thrust pins 14. By moving the housing 3 relative to the stationary slider 4, the jaws 6 of the working member 5, mounted on the slider 4, are removed from the conical surface 34 of the housing 3 and can turn about the axle 7 to encompass and then grip the head 18 of the fuel assembly 19.

The gripping means 1 is thus prepared to grip the fuel assembly 19. The longitudinal axis 37 of the gripping means 1 may be at some distance m from the longitudinal axis 39 of the fuel assembly 19 which is under the gripping means 1.

The nuclear reactor refuelling machine lowers the manipulator tube 2 with the gripping means 1. As this takes place, the conical surface 35 (FIG. 3) of the housing 3 of the gripping means 1 comes into contact with the head 18. The gripping means 1 is orientated towards the head 18 by pivoting about the center 20 of the main articulated joint 13, and the head 18 is introduced into the housing 3 and gripped by the jaws 6. The axis 37 of the gripping means 1 is deflected with respect to the axis 38 of the manipulator tube 2 through an angle α. The deflection occurs about the center 20 of the main articulated joint 13 found on the longitudinal axis 21 of the thrust pins 14, which is the pivot axis of the gripping means 1. The housing 3 with the slider 4 and the support 22 are deflected, but the rod 8 remains stationary because the spherical lug 11 is on the pivot axis of the gripping means 1, and the end of the rod 8, which is coupled through the shackle 9 to the axle 36 received in the grooves 15 (FIG. 2) is also stationary.

As the gripping means 1 is displaced, the elastic rod 33 (FIG. 3) bends within the elastic deformation range because one of its ends, coupled to the rod 8, is stationary, whereas the opposite end, which is in contact with the displaced slider 4, is also displaced.

As the gripping means 1 pivots about the center 20, the spherical recess 25 of the thrust collar 24 of the rod 8 moves about the spherical lug 23 of the support 22, contacting it and simultaneously transmitting the driving force from the refuelling machine's drive through the support 22 and the housing 3 to the fuel assembly 19. Thus the fuel assembly 19 is acted on and installed into the reactor core or a socket of a storage container (not shown).

After the head 18 of the fuel assembly 19 is inserted into the housing 3 of the gripping means 1 and gripped by the jaws 6, the drive of the nuclear reactor refuelling machine raises the chain 9 and the gripping 1 into the manipulator tube 2. First, the rod 8, the support 22 and the housing 3 go up, while the slider 4 remains stationary due to the action of the spring 32. The support 22 is out of contact with the slider 4, so there again is a gap 1 (FIG. 1) between them. The jaws 6 come into contact with the conical surface 34 of the housing 3 and are closed, gripping the head 18 by its outer projection 17 (in FIG. 1, this position of the fuel assembly 19 is shown by the dash line). The locks 30 are forced from the apertures 30 into the gap 1 and abut against the slider 4, thus preventing mutual displacement of said slider 4 and the housing 3, which, in turn, prevents accidental opening of the jaws 6 of the gripping means 1. The gripping means 1 and the fuel assembly 19 are drawn into the manipulator tube 2. The refuelling machine raises the manipulator tube 2, moves to a desired location and places the manipulator tube 2 above the socket (not shown) in which the fuel assembly 19 is to be placed.

By successively lowering the manipulator tube 2 and the gripping means 1, the fuel assembly 19 is installed in the socket, and the gripping means opens. The manipulator tube 2 goes up with the open gripping means 1 and withdraws the head 18 of the fuel assembly 19 from the housing 3 of the gripping means 1, whereupon the elastic rod 33 unbends and deflects the gripping means 1 until its longitudinal axis 37 is aligned with the longitudinal axis 38 of the manipulator tube 2.

Other fuel assemblies are transferred in a similar way.

The proposed gripping means of a nuclear reactor refuelling machine firmly grips the heads of fuel assemblies, including fuel assemblies whose longitudinal axes are misaligned with respect to that of the gripping means.

What is claimed is:

1. In a refuelling machine for a nuclear reactor, containing a manipulator tube driven by means of a drive and provided with longitudinally extending grooves on its internal surface, having end walls, a gripping means arranged inside said manipulator tube and comprising:
   a housing;
   a slider accomodated in said housing and having a first end and a second end, said slider having a hole provided at its first end;
   thrust pins having a longitudinal axis, mounted on said slider and interacting with said longitudinally extending grooves;
   a working member intended to grip the head of a fuel assembly of said nuclear reactor and pivotably secured at said second end of said slider;
   a rod mounted on said housing and driven by said drive;
   a spherical lug provided on said rod, received in said hole of said slider and interacting with the surface of said slider, thus forming a first articulated joint having a center, whereby said slider is mechanically coupled to said rod.

2. A gripping means as claimed in claim 1, wherein said spherical lug of said rod is received in said hole of said slider so that at a moment said working member grips said head of said fuel assembly, said center of said first articulated joint is on said longitudinal axis of said thrust pins interacting with said end walls of said longitudinally extending grooves.

3. A gripping means as claimed in claim 1, including a support mounted on said housing; a spherical lug provided on said support; a thrust collar provided on said rod at some distance from said spherical lug; a spherical recess provided in said thrust collar and interacting with said spherical lug of said support, thus forming a second articulated joint whose center is matched with said center of said first articulated joint, the two articulated joints helping to transmit the driving force from said drive to said fuel assembly.

4. A gripping means as claimed in claim 2, including a support mounted on said housing; a spherical lug provided on said support; a thrust collar provided on said rod at some distance from said spherical lug; a spherical recess provided in said thrust collar and interacting with said spherical lug of said support, thus forming a second articulated joint whose center is matched with that of said first articulated joint, the two articulated joints helping to transmit the driving force from said drive to said fuel assembly.

* * * * *